United States Patent Office 3,412,019
Patented Nov. 19, 1968

3,412,019
METHOD OF FLOCCULATING SUSPENDED PARTICULATE MATTER FROM AN AQUEOUS MEDIUM
Merwin Frederick Hoover, Bethel Park, and Raymond J. Schaper and Jerry E. Boothe, Pittsburgh, Pa., assignors to Calgon Corporation, Pittsburgh, Pa.
No Drawing. Filed May 25, 1965, Ser. No. 458,753
6 Claims. (Cl. 210—54)

ABSTRACT OF THE DISCLOSURE

Suspended matter is flocculated in aqueous media with polymers comprising repeating units derived from diallyl amine and quaternary ammonium monomers containing groups condensed through a Michael addition reaction from a vinyl type activated double bond compound.

---

This invention relates to novel diallyl amines and novel quaternized diallyl amines, to novel, linear, water-soluble, polycationic, polyelectrolytes characterized by an N-substituted or N,N-disubstituted 3,5-methylene-linked piperidinium ring system polymerized from said amines, and to the method of flocculating suspended particulate matter from an aqueous medium comprising adding small amounts of said polymers thereto.

The novel monomers from which our novel polymers may be made are derivatives of diallyl amines and quaternized diallyl amines and have the following structures:

I 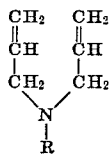

and hydrohalide salts thereof and

II 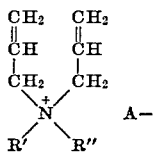

where R is a group derived by condensing a vinyl type activated double bond compound of the general formula:

(1) 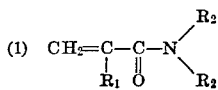

or (2) 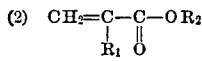

through a Michael addition reaction with diallyl amine, R' is a group derived by condensing a vinyl type activated double bond compound of the general formula $CH_2=CH-R_3$ through a Michael addition reaction with diallyl amine, and R" is $-CH_3$, $-CH_2CH_3$, $-CH_2OH$, $-CH_2CH_2OH$, or

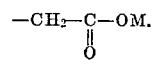

In (1) and (2), $R_1$ is $-H$ or $-CH_3$, and $R_2$ is H or alkyl to $C_4$, each $R_2$ being independently selected.
$R_3$ is an electron-withdrawing (activating) group.
$A^-$ is a noninterfering anion. M is H, alkali metal, or associated alkaline earth metal.

As is known in the art, a Michael addition reaction is the addition of an active hydrogen across an activated double bond. In the case of diallyl amine, it would be:

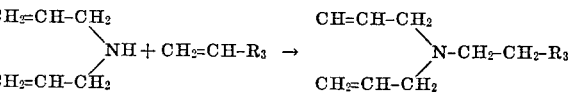

where $R_3$ is as above defined.

Examples of compounds of (1), (2), and the specified $CH_2=CH-R_3$ compounds include acrylamide, methacrylamide, N,N-dialkyl acrylamides, N,N-dialkyl methacrylamides, N-alkanol acrylamides, N-alkanol methacrylamides, N-(dialkyl amino alkyl) acrylamides, N-(dialkyl amino alkyl) methacrylamides, alkyl acrylates to $C_4$, alkyl methacrylates to $C_4$, dialkyl amino alkyl acrylates, and dialkyl amino alkyl methacrylates.

See the following articles in the "Journal of the American Chemical Society"; butler and Bunch, vol. 71, 3120 (1949); Butler and Angelo, vol. 77, 1767 (1954); Butler and Angelo, vol. 78, 4797 (1956); and Butler et al., vol. 80, 3615 (1958); Russian Patent No. 148,405; general Mills British Patent No. 906,531; and Butler, Angelo and Crawshaw U.S. Patent No. 2,926,161. However, our monomers and polymers are substantially different from those disclosed in these references.

Our novel tertiary diallyl amine adducts as in I, can be prepared by condensation of the ester, amide, or salt of acrylic acid or methacrylic acid with diallyl amine, as the examples to follow will illustrate.

The quaternized version (II) is prepared by reacting the unquaternized version (I) with a quaternizing agent such as dialkyl sulfates, ethylene oxide, the alkyl halides, etc. These reactions will also be illustrated by examples.

A few of the simpler quaternized amines may also be prepared by reacting an aqueous dialkyl amine solution with two moles of an allyl chloride. For example, diallyl methyl (β-propionamido) ammonium chloride could be prepared by reacting methyl β-propionamide amine with allyl chloride:

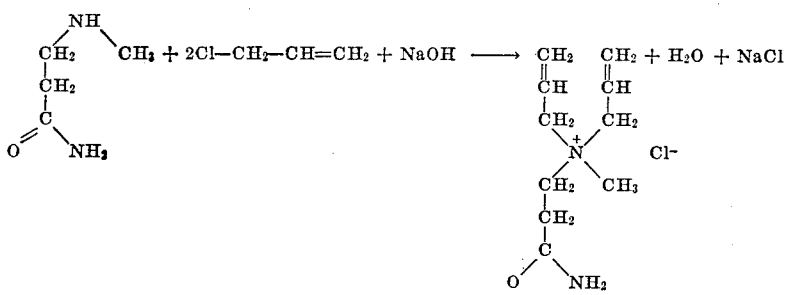

However, quaternization with a quaternizing agent is the preferred preparation.

Our invention contemplates homopolymers of each of the above-described monomers, and polymers consisting essentially of such monomers. It also contemplates copolymers and more complex polymers comprising repeating units derived from monomers above-described.

While we do not wish to be bound by any theories, based on equations disclosed in "Chemical and Engineering News," vol 35, 22, (1957), and Butler and Angelo in the "Journal of the American Chemical Society," vol. 79, 3128 (1957), we propose the following equations to describe the intramolecular intermolecular free radical polymerization of our novel quaternized diallyl amine monomers.

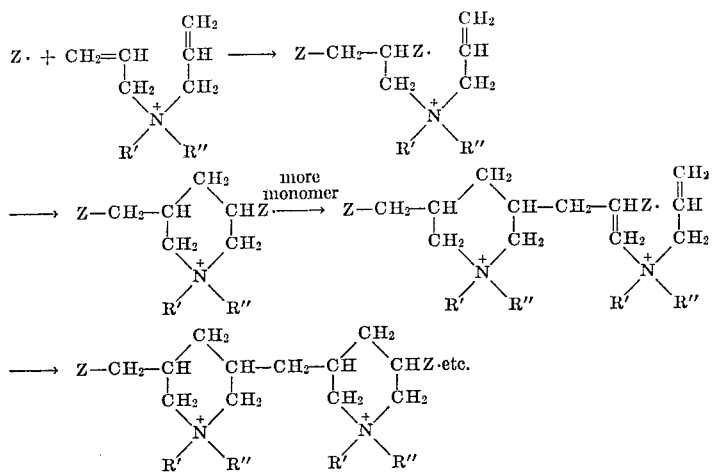

where R' and R" are the adducts described above, and Z· is an initiating free radical.

A similar reaction is proposed for the unquaternized version in the hydrohalide salt form. Quaternization may be performed before or after the monomer is polymerized, but the preferred method is to quaternize before polymerization. Examples to follow will illustrate polymerization procedures.

The following examples illustrate production of several of our novel amine monomers, quaternized monomers, and polymers.

EXAMPLE I

Preparation of β-propionamido diallyl amine

To a four-necked, three-liter flask, fitted with a stirrer, thermometer, dropping funnel and reflux condenser, was added three moles (216.3 g.) of acrylamide and 216.3 g. of water. Three moles (291.5 g.) of diallylamine were added dropwise over a one-hour period. The resulting exothermic reaction was maintained at about 60° C. during the addition. After the addition was complete, the reaction mixture was held at 60° C. for six additional hours yielding a homogeneous aqueous solution of β-propionamido diallyl amine.

EXAMPLE II

Preparation of β-methacrylato diallyl amine

A suitable reaction vessel was charged with 6 moles (583 g.) of diallylamine. 6 moles of methyl acrylate (517 g.) were added and the mixture was refluxed for three hours.

The crude reaction mixture was vacuum distilled and the fraction containing β-methacrylato diallyl amine was collected at 47° C. at 0.5 mm. The yield was 80%, based on diallylamine.

EXAMPLE III

Preparation of diallyl methyl (β-propionamido) ammonium chloride

The solution of β-propionamido diallyl amine prepared in Example I was placed in a pressure reactor, and to it was added 3.3 moles (166.7 g.) of methyl chloride. The vessel was heated to about 40° C., at which temperature the pressure was approximately 125 p.s.i.g. The temperature was held at 40° C. for five hours, during which time the pressure fell, indicating completeness of reaction, and formation of diallyl methyl (β-propionamido) ammonium chloride.

EXAMPLE IV

Preparation of diallyl methyl (β-propionitrilo) ammonium metho sulfate

To a four-necked, three-liter flask, fitted with a stirrer, thermometer, addition funnel, and reflux condenser was added six moles (583 g.) of freshly distilled diallylamine. Six moles (318.4 g.) of acrylonitrile were added dropwise while the temperature was maintained at about 60° C. After the addition was complete, the reaction mixture was refluxed overnight, and vacuum distilled at 64° C. and 0.5 mm. A 75% yield of 3-(diallylamino) propionitrile was obtained.

One mole (150.2 g.) of 3-(diallylamino) propionitrile was dissolved in 300 ml. of anhydrous ethyl ether. This solution was charged into a suitable reaction flask, and to it was added 1 mole (126.1 g.) of dimethyl sulfate dissolved in 200 ml. of anhydrous ethyl ether.

During the addition of dimethyl sulfate there was a slight exothermic. As the addition proceeded, the reaction mixture became cloudy, and eventually an oil settled out. The diallyl methyl β-propionitrilo ammonium methyl sulfate produced could not be crystallized because of its extreme affinity for water.

EXAMPLE V

Preparation of diallyl methyl (β-methylpropionato) ammonium metho sulfate

One mole (183.2 g.) of the methyl ester of 3-diallylamino acrylic acid, was dissolved in 300 ml. of anhydrous ethyl ether. To this was added 1 mole (126.1 g.) of dimethyl sulfate dissolved in 200 ml. of anhydrous ethyl ether.

The reaction was very exothermic and had to be cooled several times. Heavy white crystals precipitated with the addition of the dimethyl sulfate, and continued to be formed during the addition.

After the addition was complete, the mixture was allowed to set overnight at room temperature.

The crystals of diallyl methyl (β-methylpropionato) ammonium methosulfate formed were filtered off and washed with anhydrous ethyl ether.

EXAMPLE VI

Preparation of diallyl ethanol (β-propionamido) ammonium chloride

A solution of 3-(diallylamino) propionamide formed by the procedure of Example I was placed in a pressure reactor. To it was added 3.0 moles of HCl and 3.3 moles of ethylene oxide. The temperature was held at 40° C. for five hours during which time the pressure fell indicating the formation of diallyl ethanol (β-propionamido) ammonium chloride.

EXAMPLE VII

Preparation of polymer of β-propionamido diallyl amine

To 200 g. β-propionamido diallyl amine was added 81.7 g. conc. HCl in a suitable reaction vessel. The solution was purged with nitrogen for one hour at 50° C. The temperature was raised to 80° C. and a 3 mole percent solution of ammonium persulfate was metered in. The temperature rose to 94° C. and was held there for one hour. The resulting polymeric solution was highly viscous and colored slightly red.

EXAMPLE VIII

Preparation of polymer of diallyl methyl (β-propionamido) ammonium chloride

A 75% solution of diallyl methyl (β-propionamido) ammonium chloride was charged into a suitable polymerization apparatus. The pH was adjusted to 6.5 with HCl. The reaction mixture was purged with nitrogen at 80° C. in order to sweep out any dissolved oxygen. A solution of ammonium persulfate corresponding to $2.5 \times 10^{-4}$ moles catalyst/mole monomer per minute was added at 80° C. and the resulting exotherm reached 112° C. The solution was then diluted to approximately 60% and heated at 80° C. for one hour.

The polymer solution was extremely water soluble even though it was so viscous as to be barely pourable. This polymer was found to be an effective coagulant.

EXAMPLE IX

Preparation of polymer of diallyl methyl (β-propionitrilo) ammonium chloride

A solution of diallyl methyl (β-propionitrilo) ammonium chloride was charged into a suitable polymerization vessel. The pH was adjusted to 6.0 and the solution was purged with nitrogen at 80° C. for one hour. A solution of ammonium persulfate corresponding to $5 \times 10^{-5}$ moles catalyst/mole monomer per minute was added at the rate of ½ ml./minute. The reaction mixture was exothermal to about 100° C. The polymer solution was deep red and viscous.

EXAMPLE X

Preparation of polymer of diallyl methyl (β-methylpropionato) ammonium metho sulfate A suitable polymerization vessel was charged with a solution of diallyl methyl (β-methylpropionato) ammonium metho sulfate. The pH was adjusted to 6.0 and the solution was purged with nitrogen at 80° C. for one hour. A solution of ammonium persulfate corresponding to $5 \times 10^{-5}$ moles catalyst/mole monomer per minute was added at the rate of ½ mole/minute. An exothermic reaction resulting in a viscous solution indicated the formation of the polymer.

Small amounts of certain water-soluble cationic polymers are very useful in removing suspended particulate matter from aqueous media. Since most suspended particulate matter in aqueous media is negatively charged, a good flocculant should be characterized by a high cationic charge density in addition to a long chain containing hydrogen bonding functional groups such as amide or hydroxyl to enhance adsorption and thereby cause interparticle bridging.

Due to the large number of positively charged atoms, our quaternized polymers have a very high cationic charge density. The unquaternized polymers also develop a cationic charge due to the basic nature of amines:

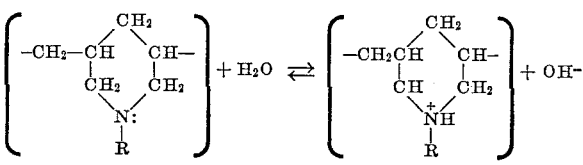

The following table, understandable to those skilled in the art, demonstrates the strong cationic nature of a sample of the polymer of diallyl methyl (β-propionamido) ammonium chloride upon a 100 p.p.m. suspension of Montmorillonite Clay at a pH of 5.8:

|  | Final Turbidity (p.p.m.) | Zeta Potential of Floc (mv.) |
| --- | --- | --- |
| Polymer Concentration: |  |  |
| 0.0 p.p.m. | 100 | −28.5 |
| 1.5 p.p.m. | 5.1 | −13.2 |
| 2.5 p.p.m. | <0.2 | −5.5 |
| 3.5 p.p.m. | 3.4 | +11.5 |
| 4.5 p.p.m. |  | +19.9 |

Because of the high cationic charge density of our polymers, they are often better flocculants than the well-known flocculants, such as the polyalkylene polyamines. Experiments were performed on five polymers in order to determine their effectiveness as flocculants. In these experiments each polymer was added to a sewage sample, where it immediately flocculated the solid suspended matter. The sample was then poured at once into a Buchner funnel under a 25″ vacuum, and the time required for a dry cake to form was recorded.

Polymers which can rapidly form a dry cake under such conditions are generally effective flocculants in commercial sewage plants since similar conditions are encountered there. In the following table giving the results of these experiments Samples 1 and 2 are both homopolymers of diallyl methyl (β-propionamido) ammonium chloride. Sample 3 is UCAR C–149, Sample 4 is Separan C–120, and Sample 5 is Cat-Floc, all commercial flocculants.

| Sample Number | 8% X Sewage | | 8% X Sewage | | 4% Y Sewage | |
| --- | --- | --- | --- | --- | --- | --- |
|  | P.p.m. | Time, Sec. | P.p.m. | Time, Sec. | P.p.m. | Time, Sec. |
| 1 | 250 | 42 | 125 | 80 | 250 | 50 |
| 2 | 250 | 40 | 125 | 80 | 250 | 60 |
| 3 | 250 | 85 | 125 | 90 | 250 | 50 |
| 4 | 250 | 92 | 125 | 120 | 250 | 55 |
| 5 | 250 | 95 | 125 | 120 | 250 | 80 |
| Control | 0 | 420 | 0 | 420 | 0 | 240 |

Thus, the table demonstrates the superior performance of our polymers, Samples 1 and 2.

In another series of experiments 0.25 p.p.m. increments of a polymer were added every six minutes to 50 p.p.m. of No. 11 Montmorillonite Clay in 1 l. of water continuously stirred at 100 r.p.m. The amount of polymer needed to form a floc and the total time were recorded as given in the following chart:

| Polymer of— | Amount of Polymer Needed to Form a Floc (p.p.m.) | Time Needed to Form a Floc |
|---|---|---|
| Diallyl methyl (β-propionamido) ammonium chloride. | 0.75 | 14 min. 30 sec. |
| β-propionamido diallyl amine hydrochloride. | 1.0 | 19 min. 15 sec. |

All of the polymers of our invention will act as flocculants. However we prefer polymers polymerized from diallyl methyl (β-propionamido) ammonium halide, the hydrohalide salt of β-propionamido diallyl amine, and N(β-propionamido), N(carboxymethyl) diallyl ammonium salts.

While a minute amount of polymer will flocculate some suspended particulate matter, the amount of polymer needed to effectively clarify water depends on many factors, such as particle concentration, particle size, particle charge, the presence of other interfering chemicals, etc. Without knowing these factors it is difficult to predict the exact amount of polymer necessary to clarify the media without adding excess polymer. Ordinary river water would usually not require more than about 10 p.p.m., while sewage water might require 500 p.p.m. for the most desirable results. The most one can say is that sufficient polymer should be added to clarify the water without adding so much as to waste polymer, the amount being dependent upon various factors, such as those mentioned, of the particular media being clarified.

Thus, it may be seen that our invention has three related elements: novel diallyl amines and quaternized diallyl amines; novel, linear, water-soluble, polycationic, polyelectrolytes characterized by an N-substituted or N,N-disubstituted 3,5-methylene linked piperidinium ring system polymerized from said amines; and the method of flocculating suspended particulate matter from an aqueous media comprising adding small amounts of said polymers thereto.

We do not intend to be limited to the specific compounds, polymers, and methods disclosed herein for illustrative purposes. Our invention may be otherwise practiced and embodied within the scope of the following claims.

We claim:

1. A method of flocculating suspended particulate matter from an aqueous medium comprising adding thereto an effective amount of a polymer comprising repeating units derived from a diallyl amine selected from the group consisting of compounds of the general formula $$\begin{array}{c} CH_2=CH-CH_2 \\ \diagdown \\ N-R \\ \diagup \\ CH_2=CH-CH_2 \end{array}$$

and hydrohalide salts thereof where R is a group derived by condensing a vinyl type activated double bond compound selected from the group consisting of

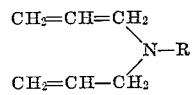 and 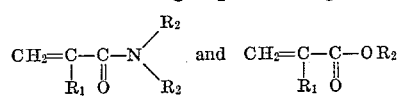

through a Michael addition reaction with diallyl amine, where $R_1$ is selected from the group consisting of —H and —$CH_3$ and each $R_2$ is independently selected from the group consisting of H and alkyl up to $C_4$.

2. A method of flocculating suspended particulate matter from an aqueous medium comprising adding thereto an effective amount of a polymer comprising repeating units derived from a diallyl ammonium salt of the general formula

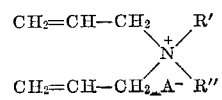

where R' is a group derived by condensing a vinyl type activated double bond compound of the general formula $CH_2=CH-R_3$ through a Michael addition reaction with diallyl amine, R'' is selected from the group consisting of —$CH_3$, —$CH_2CH_3$, —$CH_2OH$, —$CH_2CH_2OH$, and $$-CH_2-\underset{\underset{O}{\parallel}}{C}-OM$$

$R_3$ is an electron-withdrawing (activating) group, $A^-$ is a noninterfering anion, and M is selected from the group consisting of H, alkali metal, and alkaline earth metal.

3. A method of flocculating suspended particulate matter from an aqueous medium comprising adding thereto an effective amount of a polymer comprising repeating units derived from a diallyl amine selected from the group consisting of compounds of the formula

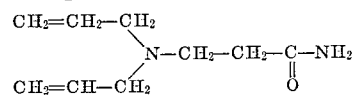

and hydrohalide salts thereof.

4. A method of flocculating suspended particulate matter from an aqueous medium comprising adding thereto an effective amount of a polymer comprising repeating units derived from a diallyl ammonium salt of the formula

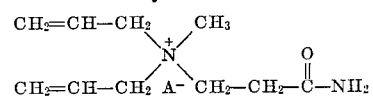

where $A^-$ is a noninterfering anion.

5. A method of flocculating suspended particulate matter from an aqueous medium comprising adding thereto an effective amount of a polymer comprising repeating units derived from a diallyl ammonium salt of the formula

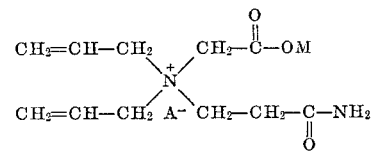

where $A^-$ is a noninterfering anion, and M is selected from the group consisting of H, alkali metal, and alkaline earth metal.

6. A method of flocculating suspended particulate matter from an aqueous medium comprising adding thereto an effective amount of a polymer comprising repeating units selected from the group consisting of (a) a diallyl amine selected from the group consisting of compounds of the general formula $$\begin{array}{c} CH_2=CH-CH_2 \\ \diagdown \\ N-R \\ \diagup \\ CH_2=CH-CH_2 \end{array}$$

and hydrohalide salts thereof where R is a group derived by condensing a vinyl type activated double bond compound selected from the group consisting of

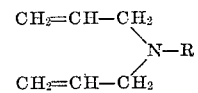

and

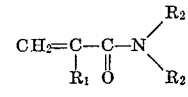

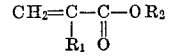

through a Michael addition reaction with diallyl amine, where $R_1$ is selected from the group consisting of —H and —$CH_3$ and each $R_2$ is independently selected from the group consisting of H and alkyl up to $C_4$, and (b) a diallyl ammonium salt of the general formula

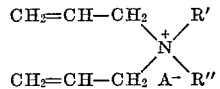

where R' is a group derived by condensing a vinyl type activated double bond compound of the general formula $CH_2=CH-R_3$ through a Michael addition reaction with diallyl amine, R″ is selected from the group consisting of $-CH_3$, $-CH_2CH_3$, $-CH_2OH$, $-CH_2CH_2OH$, and $$-CH_2-\underset{\underset{O}{\|}}{C}-OM$$

$R_3$ is an electron-withdrawing (activating) group, $A^-$ is a noninterfering anion, and M is selected from the group consisting of H, alkali metal, and alkaline earth metal.

References Cited

UNITED STATES PATENTS 2,926,161  2/1960   Butler et al. _____ 260—89.7
3,171,805  3/1965   Sven et al. _____ 210—54
3,288,770  11/1966  Butler _____ 260—89.7

MICHAEL E. ROGERS, *Primary Examiner.*

UNITED STATES PATENT OFFICE
CERTIFICATE OF CORRECTION

Patent No. 3,412,019                                        November 19, 1968

Merwin Frederick Hoover et al.

It is certified that error appears in the above identified patent and that said Letters Patent are hereby corrected as shown below:

Column 2, line 20, second chain of the formula $CH=CH-CH_2$          should read          $CH_2=CH-CH_2$ line 33, "butler" should read -- Butler --; lines 36 and 37, "general" should read -- General --; same column 2, lower portion of the last formula

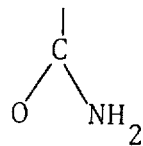          should read          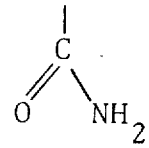

Column 6, line 10, after "charged" insert -- nitrogen --.

Signed and sealed this 16th day of February 1971.

(SEAL)
Attest:

EDWARD M. FLETCHER, JR.                 WILLIAM E. SCHUYLER, JR.
Attesting Officer                         Commissioner of Patents